June 6, 1939.  C. KLEMT  2,161,518
PARKING METER
Filed May 17, 1937  3 Sheets-Sheet 1

Inventor
Charlie Klemt

June 6, 1939.   C. KLEMT   2,161,518
PARKING METER
Filed May 17, 1937   3 Sheets-Sheet 2
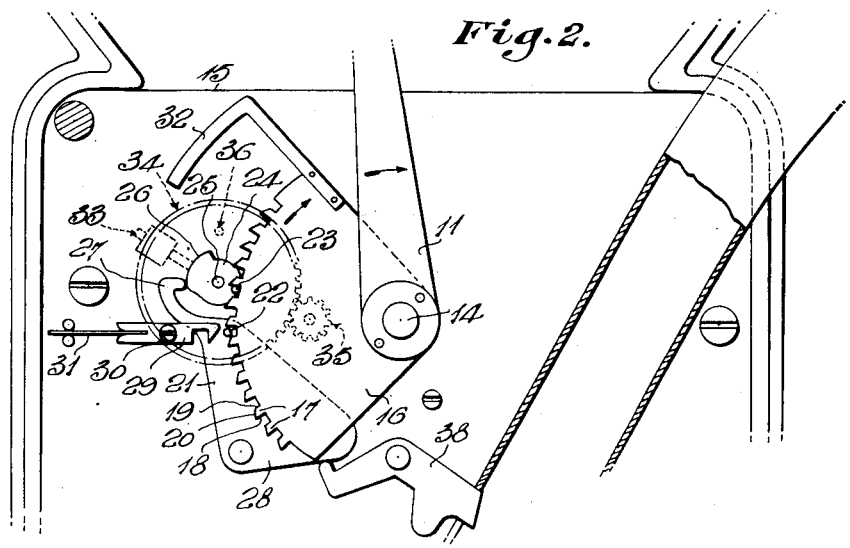
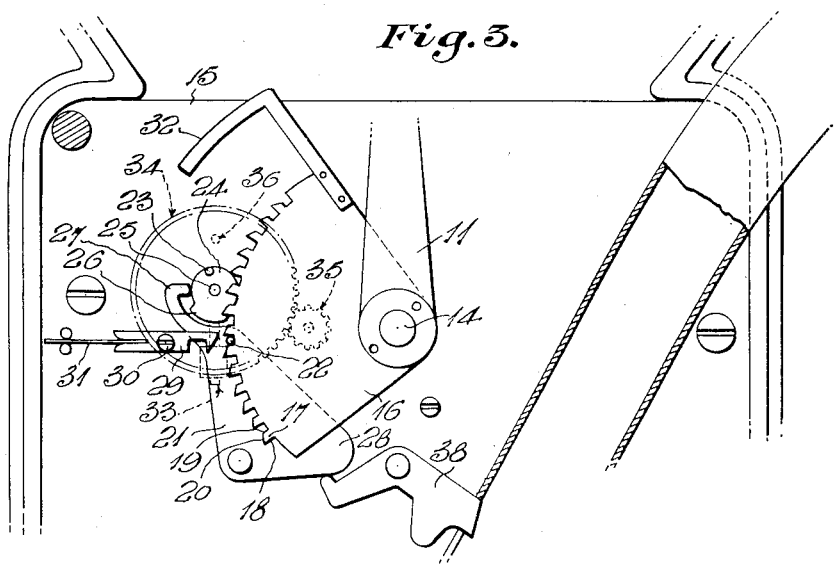
Inventor
Charlie Klemt
By H. B. Willson Yeo
Attorneys June 6, 1939.                C. KLEMT                 2,161,518
                          PARKING METER
              Filed May 17, 1937           3 Sheets-Sheet 3

Inventor
C. Klemt
By H. B. Willson &co
Attorneys

Patented June 6, 1939

2,161,518

UNITED STATES PATENT OFFICE 2,161,518

PARKING METER

Charlie Klemt, San Antonio, Tex.

Application May 17, 1937, Serial No. 143,227

8 Claims. (Cl. 161—15)

The invention relates to a parking meter or similar resettable register having indicating means, intermittently acting means for alternately advancing and freeing said indicating means, means for holding said indicating means against return from its successive indicating positions, and means for placing said holding means in a released state to allow return of said indicating means to zero when required, such a mechanism being disclosed in my U. S. application, Serial No. 99,655, filed September 5, 1936 now Patent No. 2,115,024 granted April 26, 1938.

The principal object of the present invention is to make novel provision, effective upon release of the aforesaid holding means, for restraining said holding means against return from its released state to its operative state until the indicating means has returned to zero. By thus restraining the holding means in its released state, it cannot return so quickly as to interfere with the movement of the indicating means to zero. Moreover, it cannot operate in case the aforesaid intermittently acting means should function during the return of the indicating means toward zero. Although said intermittently acting means could intercept the indicating means during its return toward zero and could therefore momentarily advance said indicating means, there would be nothing to hold the latter in advanced position when freed by said intermittently acting means, and consequently said indicating means would necessarily complete its return movement as soon as freed by said intermittently acting means.

A further object is to provide the aforesaid holding means in such form that it locks the indicating means against movement in either direction after each advance step thereof, but is automatically placed in a released state, in which it allows advance movement only of the indicating means, each time the aforesaid intermittently acting means is about to advance said indicating means, return of said indicating means to zero being effected by placing said locking means in a second released state.

Yet another aim is to provide a construction which will be rather simple and inexpensive, easy to manufacture, durable and fool-proof.

With the foregoing in view, the invention resides in the novel subject matter hereinafter described and claimed, description being accomplished by reference to the accompanying drawings.

Fig. 2 is a fragmentary elevation similar to a portion of Fig. 1 but illustrating the manner in which the holding means is released immediately prior to advancing the indicating means.

Fig. 3 is a view similar to Fig. 2 but showing the relation of parts which exists when the intermittently acting means has advanced the indicating means, the latter being again locked after its advance movement.

Figure 1:
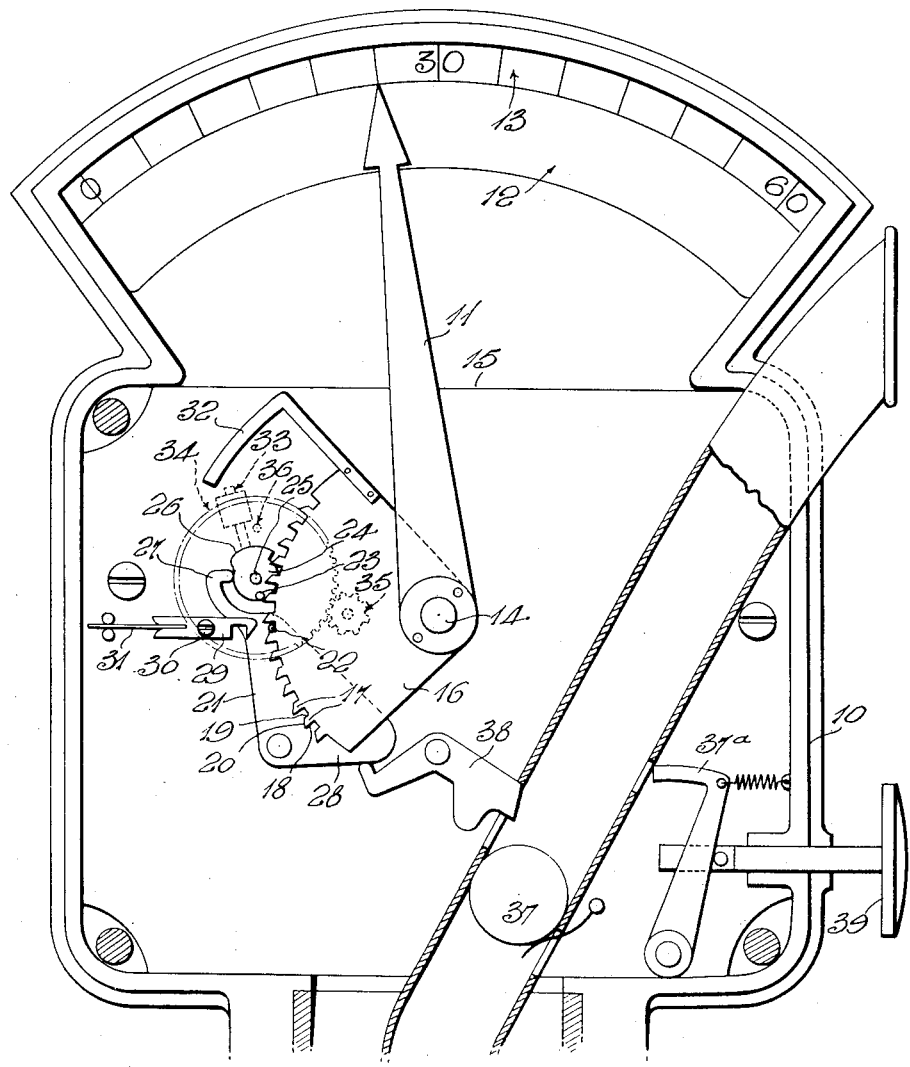
Fig. 1 is a vertical sectional view partly in elevation showing the indicating means held in one of its time-indicating positions and illustrating the intermittently acting means about to release the holding means and advance the indicating means one step.

In the drawings above briefly described, a preferred construction has been illustrated and while this construction will be specifically explained, it is to be understood that variations may be made within the scope of the invention as claimed.

A suitable casing 10 is provided to contain an indicator 11 and the various parts hereinafter described for advancing said indicator and for effecting resetting thereof to zero. The casing 10 is provided with a suitable window 12 exposing the end of the indicator 11, and with a scale 13 along an edge of said window, said scale being preferably calibrated in units of five minutes each and reading from zero to 60 in the present disclosure.

The indicator 11 is pivotally mounted at 14 upon one side of a vertical supporting plate 15 which is suitably secured in the casing 10, and a toothed sector 16 is suitably connected with said indicator in such manner that sector and indicator move bodily as a single unit. The teeth 17 of the sector 16 are each provided with a rear edge 18 which is substantially radial throughout its length, and the front edge of each of said teeth is provided with a substantially radial inner end portion 19 and with a beveled outer end portion 20. A pivoted locking dog 21 is provided with a lateral detent portion or pin 22 which seats between the rear edge 18 of one sector tooth and the front edge portion 19 of the next adjacent sector tooth, when the indicator 11 is at zero and after each successive advance of said indicator until the latter reaches the end of the scale 13, there being at this time no tooth underlying the pin 22.

A crank pin 23 on a disk 24, alternately engages with and disengages from the teeth 17 of the sector 16 to alternately advance and free said sector, thereby similarly advancing and freeing the indicator 11. This disk 24 is secured upon a shaft 25 which is intermittently driven, and said disk is provided with a cam 26 cooperable with an arm 27 on the upper end of the dog 21, for the purpose of moving said dog 21 to the released position shown in Fig. 2 when the crank pin 23 is about to advance the sector 16 and the indicator 11, the radial dimension of said cam being such that it moves the pin 22 outwardly beyond the substantially radial edge portion 19 of the subjacent tooth 17 and places said pin directly above the beveled end 20 of said subjacent tooth. Thus, as the crank pin 23 advances the sector 16, said subjacent tooth may click over the pin 22. Then, as soon as arm 27 is released by cam 26, the dog 21 may return to its original position, disposing said pin 22 again in locking engagement with two of the sector teeth 17, locking this sector and the indicator 11 against movement in either direction. The cam 26 is of course of such length as to restrain the dog 21 against return from the released state or position of Fig. 2 to the locking state or position of Fig. 3, until the pin 23 has performed its duty by advancing the sector 16 and indicator 11 one step.

Figure 4:
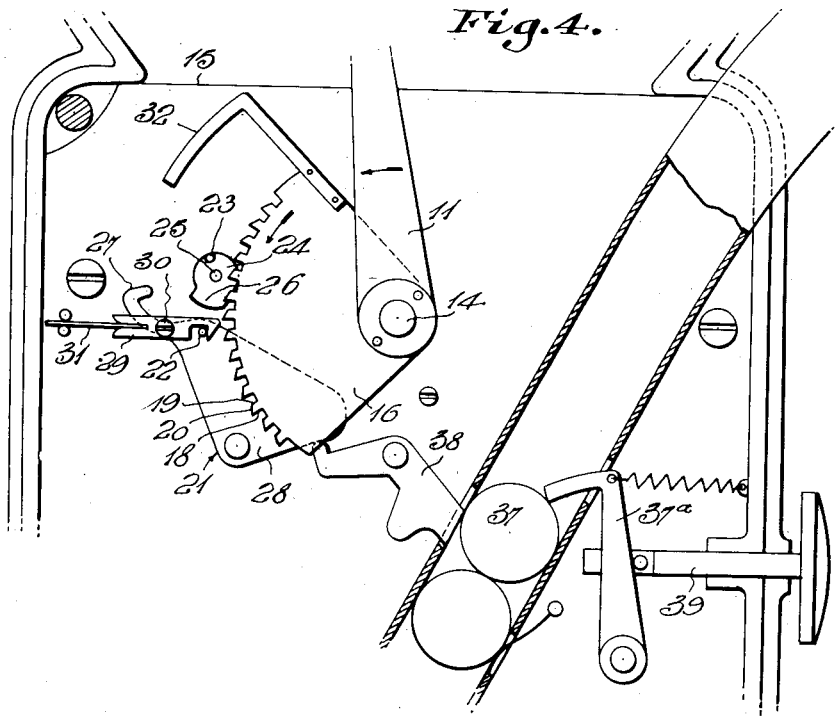
Fig. 4 is a view similar to Figs. 2 and 3 but showing the holding or locking means held in its second released state to allow return of the indicating means to zero.
Figure 5:
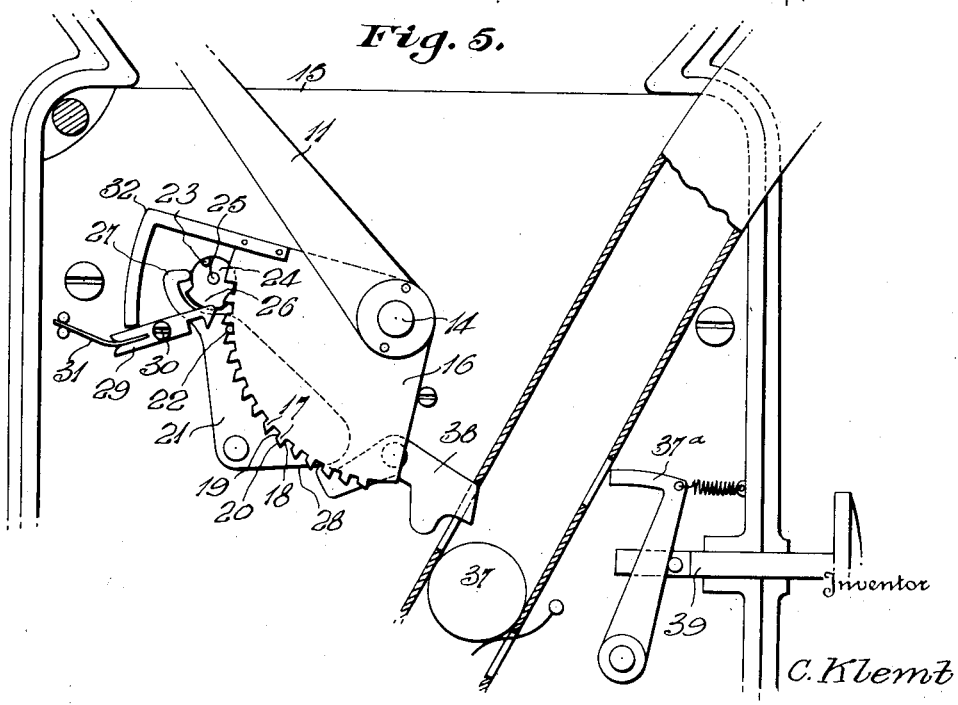
Fig. 5 is a view similar to Fig. 4 but illustrating the manner of releasing the means which restrains the holding or locking means in said second released state, allowing return of said locking or holding means to operative position.

In the preferred construction, the dog 21 is biased toward locking position by providing it with a weighted portion 28. Similarly, the indicator 11 is biased toward zero by the weight of the sector 16. When this indicator 11 is to be returned to zero, the dog 21 must be placed in a second released state or position (see Fig. 4) in which its pin 22 will entirely clear the teeth 17, thereby allowing the sector 16 to descend by gravity and consequently restoring the indicator 11 to its zero position. In order that the dog 21 may not return from the position of Fig. 4 to a locking position while the sector 16 is descending, I provide a latch 29 for restraining said dog 21 against return to said locking position until the indicator 11 has reached zero. In the present disclosure, the latch 29 is pivoted at 30 to the plate 15 and is cooperable with the pin 22, being yieldably held in position to engage said pin, by means of a suitable spring 31. As soon as the dog 21 is moved to the second released position of Fig. 4, it engages the latch 29 and this latch holds said dog against return to locking position until said latch is released. This release of the latch 29 is automatically effected by means of an arm 32 secured to the sector 16. When this sector has descended sufficiently to place the indicator 11 almost at zero, the arm 32 strikes the rear end of the latch 29 and by the time said indicator has reached zero, said arm 32 has fully released said latch 29 as shown in Fig. 5, allowing dog 21 to return into locking engagement with the teeth of the sector 16.

For intermittently rotating the shaft 25 to actuate the crank pin 23 and cam 26 thereof, the mechanism now to be described may be employed, or any other suitable mechanism may be utilized. The shaft 25 preferably passes through a bearing carried by the plate 15 and is provided with a weighted arm 33 at the side of said plate remote from the disk 24. Rotatably mounted on the shaft 25 near the weighted arm 33, is a gear 34 which may be continuously driven by a clock mechanism or the like, a portion of which is shown at 35. The gear 34 is provided with a pin or the like 36 to contact with the weighted arm 33. This arm normally hangs in the position shown in Fig. 3, the crank pin 23 being then just clear of the last tooth which it previously moved. Whenever the gear wheel 34 rotates sufficiently to bring its pin or the like 36 into contact with the arm 33, said pin starts to upwardly swing said arm, and when this arm is moved slightly past upper dead center, it quickly descends by gravity, thereby instantaneously rotating the shaft 25 to cause the pin 23 to advance the sector 16 and indicator 11 one step, and to then immediately disengage from said sector. Immediately before the pin 23 starts to move the sector 16, the cam 26 engages the arm 27 and moves the dog 21 to the released position of Fig. 2 so that the pin 22 of said dog will not interfere with advance of the sector 16, and as soon as such advance has taken place, said cam 26 frees the arm 27 allowing the dog 21 to return into locking engagement with said sector. Whenever the indicator 11 is to be returned to zero, the dog 21 is moved to the second released position shown in Fig. 4 and is latched in this position by means of the latch 29, so that this dog cannot interfere with the descent of the sector 16 while it returns the indicator 11 to its zero position. If, during the descent of the sector 16, the weighted arm 33 should descend and cause pin 23 to momentarily engage and advance said sector, there will be nothing to hold said sector in its advanced position due to the fact that dog 21 is held in the position shown in Fig. 4, and consequently just as soon as said sector is freed by said pin 23, it will complete its descent, restoring the indicator 11 to zero.

For moving the dog 21 to its second released position to allow return of the indicator 11 to zero, any preferred means may be employed. This means is, of course, of coin-controlled nature in a parking meter or the like and in the present disclosure, a coin 37 establishes an operating connection between a swingable arm 37ᵃ and a dog-releasing lever 38, said arm 37ᵃ being connected with a suitable manually operable plunger 39. When the coin 37 is inserted and the plunger 39 pushed, arm 37ᵃ causes the coin to thrust against the lever 38, so moving this lever as to swing the dog 21 to the released position of Fig. 4, said dog being held in this position by the latch 29 until said latch is released by the arm 32 upon complete restoration of the indicator 11 to its zero position.

From the foregoing taken in connection with the accompanying drawings, it will be seen that I have provided novel means whereby it is insured that nothing shall prevent complete return of the indicator 11 to zero when required, and that novel provision has been made for holding the indicator 11 against accidental movement in either direction. When the invention is embodied in a parking meter, in which field it finds its principal use, a person wishing to avail himself of the meter, deposits a coin 37 and pushes the plunger 39, thus releasing the indicator 11 from its last indicating position and causing resetting of said indicator to zero, whereupon the intermittently acting operating means will become effective to intermittently advance said indicator, and the locking means will become effective to lock it in each advanced position. If the indicator 11 be moved past the end of the scale 13 before someone resets the meter to zero, no injury will be done for there is no tooth on the sector 16 to hold the indicator in an abnormal or over-time position and whenever it moves beyond the end of the scale, it drops back to said end just as soon as the sector is released by the crank pin 23.

Excellent results may be obtained from the general construction shown and described and such construction is therefore preferably followed. However, attention is again invited to the possibility of making variations within the scope of the invention as claimed.

I claim:

1. In a resettable register having a numbered scale and a coacting pointer, one of which is advanceable with respect to the other from a zero position, and operating means for alternately advancing and freeing the advanceable member; locking means for locking said advanceable member against movement in either direction after each advance movement thereof, said locking means being placeable in one released state in which it allows only advance movement of said advanceable member, and being placeable in a second released state in which it allows return of said advanceable member to said zero position, means synchronized with said operating means for placing said locking means in and out of said one released state as required, and manually operable means for placing said locking means in said second released state when said advanceable member is to be returned to said zero position.

2. In a resettable register having a numbered scale and a coacting pointer, one of which is advanceable with respect to the other from a zero position, and operating means for alternately advancing and freeing the advanceable member; a toothed member operatively connected with said advanceable member for movement therewith, a self-applying locking dog cooperable with said toothed member for locking said advanceable member against movement in either direction after each advance movement thereof, said dog being movable to one released position in which it allows only advance movement of said advanceable member and being movable to a second released position in which it allows return of said advanceable member to said zero position, means synchronized with said operating means for moving said dog to said one released position as required, and manually operable means for moving said dog to said second released position when said advanceable member is to be returned to said zero position.

3. In a resettable register having a numbered scale and a coacting pointer, one of which is advanceable with respect to the other from a zero position, and operating means for alternately advancing and freeing the advanceable member; locking means for locking said advanceable member against movement in either direction after each advance movement thereof, said locking means being placeable in one released state in which it allows only advance movement of said advanceable member, and being placeable in a second released state in which it allows return of said advanceable member to said zero position, means synchronized with said operating means for placing said locking means in and out of said one released state as required, manually operable means for placing said locking means in said second released state when said advanceable member is to be returned to said zero position, means for restraining said locking means against return from said second released state during return of said advanceable member to said zero position, and automatically operable means operable when said advanceable member reaches said zero position for releasing said restraining means.

4. In a resettable register having a numbered scale and a coacting pointer, one of which is advanceable with respect to the other from a zero position, and operating means for alternately advancing and freeing the advanceable member; a toothed member operatively connected with said advanceable member for movement therewith, a self-applying locking dog cooperable with said toothed member for locking said advanceable member against movement in either direction after each advance movement thereof, said dog being movable to one released position in which it allows only advance movement of said advanceable member and being movable to a second released position in which it allows return of said advanceable member to said zero position, means synchronized with said operating means for moving said dog to said one released position as required, manually operable means for moving said dog to said second released position when said advanceable member is to be returned to said zero position, means for restraining said dog against return from said second released position during return of said advanceable member to said zero position, and automatically operable means operable when said advanceable member reaches said zero position for releasing said restraining means.

5. In a resettable register having a numbered scale and a coacting pointer, one of which is advanceable with respect to the other from a zero position, and operating means for alternately advancing and freeing the advanceable member; releasable means for holding said advanceable member against return from its successive indicating positions, manually operable means for releasing said holding means when said advanceable member is to be returned to said zero position, means for restraining said holding means against return from its released state during return of said advanceable member to said zero position, and automatically operable means operable when said advanceable member reaches said zero position for releasing said restraining means.

6. In a mechanism of the class described having indicating means advanceable from a zero position, and operating means for alternately advancing and freeing said indicating means; releasable means for holding said indicating means against return from its successive indicating positions, means for releasing said holding means when said indicating means is to be returned to said zero position, means for restraining said holding means against return from its released state during return of said indicating means to said zero position, and means operatively connected with said indicating means for automatically releasing said restraining means when said indicating means reaches said zero position.

7. In a mechanism of the class described having indicating means advanceable from a zero position, and means for alternately advancing and freeing said indicating means; a toothed member connected with said indicating means for movement therewith, a dog cooperable with said toothed member for holding said indicating means against return from its successive indicating positions, means for moving said dog to a released position when said indicating means is to be returned to said zero position, means for restraining said dog against return from said released position during return of said indicating means to said zero position, and means on said toothed member for releasing said restraining means when said indicating means reaches said zero position.

8. In a mechanism of the class described, a toothed member and operating means for successively advancing said member, the rear edges of the teeth of said member being substantially straight from end to end, the front edges of said teeth being substantially straight at their inner ends and beveled at their outer ends, a dog biased toward said toothed member and having a detent engageable between the straight rear edge of one tooth of said member and the straight front edge portion of the next adjacent tooth after each advance movement of said member, and means synchronized with said operating means for automatically moving said dog to position said detent at the beveled end of said next adjacent tooth when said operating means is about to advance said toothed member, whereby said beveled end of said next adjacent tooth may force said detent aside while this tooth is passing said detent and said detent may then immediately return to locking position between two more of the teeth.

CHARLIE KLEMT.